US011407685B2

United States Patent
Majcenovic et al.

(10) Patent No.: US 11,407,685 B2
(45) Date of Patent: Aug. 9, 2022

(54) BATCH FOR PRODUCING A REFRACTORY PRODUCT, METHOD FOR PRODUCING A REFRACTORY PRODUCT, A REFRACTORY PRODUCT AND THE USE OF A SYNTHETIC RAW MATERIAL

(71) Applicant: Refractory Intellectual Property GmbH & Co. KG, Vienna (AT)

(72) Inventors: Christian Majcenovic, Gratwein-Straßengel (AT); Martin Geith, Leoben (AT); Roland Nilica, St. Marein-Feistritz (AT); Josef Nievoll, Vienna (AT)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 0 days.

(21) Appl. No.: 16/643,156

(22) PCT Filed: Jul. 11, 2018

(86) PCT No.: PCT/EP2018/068766
§ 371 (c)(1),
(2) Date: Feb. 28, 2020

(87) PCT Pub. No.: WO2019/068380
PCT Pub. Date: Apr. 11, 2019

(65) Prior Publication Data
US 2020/0255337 A1 Aug. 13, 2020

(30) Foreign Application Priority Data
Oct. 4, 2017 (EP) .................................. 17194673

(51) Int. Cl.
*C04B 35/043* (2006.01)
*C04B 35/64* (2006.01)

(52) U.S. Cl.
CPC ............ *C04B 35/043* (2013.01); *C04B 35/64* (2013.01); *C04B 2235/3206* (2013.01); *C04B 2235/3208* (2013.01); *C04B 2235/3217* (2013.01); *C04B 2235/3272* (2013.01); *C04B 2235/349* (2013.01); *C04B 2235/3418* (2013.01); *C04B 2235/5427* (2013.01); *C04B 2235/78* (2013.01)

(58) Field of Classification Search
CPC .................. C04B 35/043; C04B 35/64; C04B 2235/3206; C04B 2235/3208; C04B 2235/3217; C04B 2235/3272; C04B 2235/3418; C04B 2235/349; C04B 2235/5427; C04B 2235/78

See application file for complete search history.

(56) References Cited

U.S. PATENT DOCUMENTS

| | | | |
|---|---|---|---|
| 5,506,181 A | 4/1996 | Matsumoto et al. | |
| 2012/0267812 A1* | 10/2012 | Schofalvi | C04B 35/101 264/30 |
| 2013/0090224 A1* | 4/2013 | Iwata | C04B 35/66 501/32 |
| 2016/0304402 A1 | 10/2016 | Kriven et al. | |

FOREIGN PATENT DOCUMENTS

| | | |
|---|---|---|
| CN | 101263093 A | 9/2008 |
| CN | 106588024 A | 4/2017 |
| DE | 2461801 C3 | 1/1979 |
| EP | 1118601 A1 | 7/2001 |
| EP | 2522645 A1 | 11/2012 |
| JP | 2000-233966 A | 8/2000 |
| JP | 2000-351678 A | 12/2000 |
| JP | 2003-171171 A | 6/2003 |
| JP | 200426564 A | 1/2004 |
| RU | 10171 U1 | 6/1999 |
| RU | 2379255 C2 | 1/2010 |
| SU | 374258 A1 | 3/1973 |
| SU | 482940 A3 | 8/1975 |
| SU | 553232 A1 | 4/1977 |
| SU | 1708798 A1 | 1/1992 |
| WO | 2011011470 A1 | 1/2011 |
| WO | 2019068380 A1 | 4/2019 |

OTHER PUBLICATIONS

"International Search Report for PCT Patent Application No. PCT/EP2018/068766", dated Sep. 10, 2018, 4 Pages.
"Written Opinion of the International Searching Authority for PCT Patent Application No. PCT/EP2018/068766", dated Sep. 10, 2018, 7 Pages.
"Office Action for Chinese Patent Application No. 201880056286.1", dated Aug. 13, 2021, 20 Pages.
"Office Action for Russian Patent Application No. 2020107003", dated Nov. 3, 2021, 11 Pages.
"Office Action for Japanese Patent Application No. 2020-511749", dated May 9, 2022, 9 pages.

* cited by examiner

*Primary Examiner* — Karl E Group
*Assistant Examiner* — Cameron K Miller
(74) *Attorney, Agent, or Firm* — Calfee, Halter & Griswold LLP

(57) ABSTRACT

The invention relates to a batch composition for producing a refractory product, a method for producing a refractory product, a refractory product, and to the use of a synthetic raw material.

15 Claims, No Drawings

BATCH FOR PRODUCING A REFRACTORY PRODUCT, METHOD FOR PRODUCING A REFRACTORY PRODUCT, A REFRACTORY PRODUCT AND THE USE OF A SYNTHETIC RAW MATERIAL

The invention relates to a batch for producing a refractory product, a method for producing a refractory product, a refractory product and the use of a synthetic raw material The term "refractory product" in the sense of the invention refers to both refractory ceramic (i.e. sintered) products and refractory products with carbon bond, in particular in each case with an application temperature of more than 600° C. and preferably refractory materials according to DIN 51060: 2000-6, i.e. materials with a pyrometric cone equivalent greater than SK17. The determination of the pyrometric cone equivalent can be carried out in particular in accordance with DIN EN 993-12: 1997-06.

As is well known, a "batch" refers to a composition of one or more components or raw materials by which a refractory product can be produced by means of a temperature treatment, for example by means of a ceramic firing to produce a sintered refractory product.

Like all ceramic products, refractory products, in particular refractory ceramic products, are generally very brittle. However, high brittleness of refractories can lead to deterioration of the refractory properties of the products, in particular, for example, reduced resistance to thermal shock. The state of the art therefore includes technologies to reduce the brittleness of a refractory product in order to improve its thermal shock resistance. For example, it is known to reduce the brittleness of refractory products by means of so-called elasticizers which are incorporated into the matrix of the product, thereby improving the thermal shock resistance of the product. The mode of action of these elasticizers is based on the fact that they have a different thermal expansion behavior than the base component of the refractory product, so that during ceramic firing of the product and its subsequent cooling, stresses occur between the elasticizer and the base component. This causes micro-cracks to form in the product, which compensate for part of the fracture energy in the event of mechanical stress on the product, thus reducing the risk of the product becoming brittle. However, the disadvantage of using the known elasticizers is that the brittleness of the refractory product often cannot be reduced to the desired extent. A further disadvantage is that the difference in thermal expansion behavior between the base component on the one hand and the elasticizer on the other hand is predetermined in particular due to the given thermal expansion behavior of the elasticizer and the stresses between the elasticizer and the base component necessary for microcrack formation can therefore frequently not be adjusted to the desired extent.

It is an object of the invention to provide a batch by which a refractory product with a low brittleness or with a high thermal shock resistance can be produced. It is a further object of the invention to provide said batch, comprising an elasticizer by means of which the brittleness of the refractory product which can be produced from the batch can be reduced or its resistance to thermal shock can be increased. Furthermore, it is an object of the invention to provide said batch, comprising said elasticizer by means of which the brittleness of the refractory product which can be produced from the batch can be reduced to a desired extent or its thermal shock resistance can be increased to a desired extent.

A further object of the invention is to provide a refractory product with a low brittleness or a high thermal shock resistance.

A further object of the invention is to provide a process to produce such a refractory product.

According to the invention, the object is solved by providing a batch to produce a refractory product, comprising the following components:

A base component of at least one refractory ceramic raw material; and at least one synthetic raw material having the following features:

The synthetic raw material consists of bodies, the bodies having the following features:

The bodies consist of grains of at least one refractory ceramic raw material sintered together, the bodies having a proportion of clay minerals of less than 10% by mass relative to the total mass of the bodies;

the bodies have a ratio of (thickness):(width):(length) of $(1):(\geq 1$ and $\leq$length$):(\geq 3)$.

Surprisingly, according to the invention, such bodies of sintered grains in a refractory product have been found to act as elasticizers by which the brittleness in a refractory product made from such a batch can be significantly reduced. This reduction in the brittleness of the refractory product or the improvement in its resistance to thermal shock is reflected in particular in a significantly reduced modulus of elasticity (E-module) of such a product. Thus, a refractory product produced from a batch comprising the synthetic raw material from sintered bodies according to the invention has a significantly reduced modulus of elasticity compared to such a refractory product manufactured from a corresponding batch, but without such a synthetic raw material from sintered bodies.

The exact mode of action of the body as an elasticizer has not yet been finally clarified. The inventors suspect that, due to the individual geometry and composition of the bodies, local stress fields build up around the bodies during the firing of a batch comprising such bodies, which leads to microcracks in the refractory product produced in this way, which reduces the brittleness of the product.

Against this background, a further essential advantage of the batch according to the invention results. The extent of microcracks formed by the bodies in the refractory product can be adjusted by individual adjustment of the structure and geometry of the bodies. In contrast to the state of the art, where elasticizers are usually formed from a material with a predetermined thermal expansion behavior, the extent of the effect of the bodies as elasticizers in a product produced from the batch according to the invention can thus be individually adjusted by the geometry and/or composition of the bodies.

According to the invention, however, it was also found that the refractory properties of a refractory product produced from a batch comprising sintered bodies can deteriorate, in particular the high refractoriness of such a product can deteriorate. In particular, it has been found that the properties for refractoriness under load of such a product are deteriorated when the composition of the bodies is such that they form melting phases even at relatively low application temperatures of the product. In this respect, it was determined according to the invention that the bodies should have a proportion of clay minerals below 10% by mass, so that the bodies do not form any quantities of low-melting phases which negatively affect the temperature resistance at relatively low temperatures, i.e. in particular already at temperatures below 1400° C. and even more preferably 1450° C.

In this context, clay minerals are understood to be aluminosilicates in particular, especially clay minerals of the kaolin group, especially kaolinite. In order not to deteriorate the refractory properties of a refractory product manufactured from the batch according to the invention with respect to its refractoriness under load, it is provided in this respect that the bodies have a proportion of clay minerals of less than 10% by mass and particularly preferably have a proportion of clay minerals as close as possible to a proportion of 0% by mass, i.e. more preferably less than 9, even more preferably less than 5% by mass, even more preferably less than 3% by mass, even more preferably less than 2% and even more preferably less than 1% by mass, in each case relative to the total mass of the bodies.

According to the invention, it was found that in particular the refractory properties of a refractory product manufactured from the batch according to the invention deteriorate with respect to its refractoriness under load when the bodies contain a proportion of the clay mineral mullite. According to the invention, it is therefore preferably provided that the bodies have a mullite content of less than 7% by mass, more preferably less than 3% by mass and even more preferably less than 1% by mass, in each case relative to the total mass of the bodies.

Also in order to keep the proportion of any melting phases formed in the bodies as low as possible, it may be provided that the bodies have a proportion of $SiO_2$ below 30% by mass, relative to the total mass of the bodies, more preferably below 20%, even more preferably below 10% by mass, even more preferably below 5% by mass, even more preferably below 3% by mass and even more preferably 1% by mass.

Also in order to keep the proportion of melting phases in the bodies as low as possible, it may be provided that the bodies have a proportion of glass phases below 10% by mass, relative to the total mass of the bodies, even more preferably below 5% by mass, even more preferably below 3% by mass, even more preferably below 2% by mass and even more preferably 1% by mass.

Finally, also in order to keep the proportion of melting phases in the bodies as low as possible, it may be provided that the bodies have a total mass of alkalis, in particular a total mass of $Na_2O$, $K_2O$ and $Li_2O$, of less than 3% by mass relative to the total mass of the bodies, even more preferably less than 2% by mass and even more preferably less than 1% by mass.

The bodies of the batch according to the invention consist of grains of at least one refractory ceramic raw material sintered together. Each body thus represents an independent sintered body, each of which is formed from sintered grains of one or more refractory ceramic raw materials. These sintered bodies represent a synthetic raw material which the batch according to the invention comprises to reduce the brittleness of a refractory product made therefrom.

Generally, the bodies may be formed of sintered grains of at least one refractory ceramic raw material of any kind. Preferably, the bodies comprise sintered grains of at least one of the following refractory ceramic raw materials: magnesia, spinel, corundum, zirconia, forsterite, chromium ore, zirconia corundum, zircon mullite, aluminum titanate, magnesium titanate or calcium titanate. According to one embodiment, the bodies comprise grains of the above-mentioned refractory ceramic raw materials sintered together to at least 90% by mass, more preferably at least 95% or even 100% by mass, in each case relative to the total mass of the bodies.

Magnesia (MgO) may be present in the bodies in the form of at least one of the raw materials sintered magnesia or fused magnesia. "Spinel" is at least one mineral from the group of spinels. In particular, spinel may be present in the bodies in the form of at least one of the minerals magnesia spinel ($MgAl_2O_4$), hercynite ($FeAl_2O_4$), galaxite ($MnAl_2O_4$), chromite ($FeCr_2O_4$), pleonaste (($Mg$, $Fe$)($Al$, $Fe$)$_2O_4$), picrochromite ($MgCr_2O_4$), hausmannite ($Mn_3O_4$), magnetite ($Fe_3O_4$) or gahnite ($ZnAl_2O_4$). Corundum can be present in the bodies in the form of at least one of the raw materials fused alumina, sintered alumina or calcined alumina. Zirconia ($ZrO_2$) can be present in the bodies in fully or partially stabilized form, for example stabilized by at least one of the oxides CaO, MgO or $Y_2O_3$.

In particular, the bodies may include sintered grains of at least one of the following refractory ceramic raw materials: magnesia, spinel or corundum, preferably magnesia spinel, hercynite or corundum, particularly preferably magnesia spinel, hercynite or sintered corundum, preferably in each case to at least 90% by mass, more preferably at least 95% by mass or even 100% by mass, each relative to the total mass of the bodies.

According to the above-mentioned raw materials, the bodies may comprise at least one of the following mineral phases: periclase (MgO), magnesiaspinel, hercynite, galaxite, chromite, pleonaste, picrochromite, hausmannite, magnetite or gahnite, corundum ($Al_2O_3$), zirconia, forsterite, zircon corundum, zircon mullite, aluminum titanate, magnesium titanate or calcium titanate. In particular, the bodies may comprise the above-mentioned mineral phases to at least 90% by mass, more preferably at least 95%, even more preferably at least 98% by mass and even more preferably at least 99% by mass or even 100% by mass, each relative to the total mass of the bodies.

According to a preferred embodiment, it is provided that the bodies comprise at least one of the mineral phases periclase, magnesia spinel, hercynite or corundum, particularly preferably magnesia spinel, hercynite or corundum, preferably to at least 90% by mass, more preferably at least 95% by mass and even more preferably at least 99% by mass or even 100% by mass, each relative to the total mass of the bodies.

The bodies have a ratio of (thickness):(width):(length) of (1):($\geq 1$ and $\leq$length):($\geq 3$). In other words, the width of the body is greater than or equal to the thickness of the body and less than or equal to the length of the body; furthermore, the length of the body is greater than or equal to three times the thickness of the body.

The bodies thus essentially have a rod-shaped or a plate-shaped geometry. Whether the bodies essentially have such a rod-shaped or a plate-shaped geometry depends on the ratio of the width to the thickness and length of the bodies. If the width is equal to or only slightly greater than the thickness of the body, the body is essentially rod-shaped. If, on the other hand, the width is greater, and in particular only slightly less than or equal to the length of the body, the body is essentially in the plate-shaped.

According to a preferred embodiment, the bodies have a ratio of (thickness):(width):(length) of (1):(1 to 5):(3 to 5), the width, as previously stated, being less than or equal to the length of the body.

In accordance with the invention, it has been found that the bodies develop their elasticizing effect particularly effectively starting from a length of 1 mm with the ratio of thickness to width to length according to the invention. The inventors assume that the bodies only build up a sufficient stress field around the bodies from about this length onwards, which leads to microcracks in the refractory product. Furthermore, according to the invention, it was found that the bodies from this length onwards can effectively bridge macro cracks in the product, which could lead to damage or even destruction of the product, from a length of about 1 mm. In this respect, the bodies can inhibit or even prevent the propagation of cracks in the product which could lead to its damage. Furthermore, according to the invention, it has been found that the bodies break easily from a length of about 30 mm onwards during the manufacture of a refractory product using the bodies, so that the bodies no longer have a defined length in the batch and the refractory product manufactured from them. Against this background, according to a preferred embodiment, the bodies have a length in the range from 1 to 30 mm. In this respect, the bodies may preferably have a length of not more than 30 mm, more preferably not more than 25 mm, even more preferably not more than 20 mm and even more preferably not more than 15 mm. Furthermore, the bodies may preferably have a length of at least 1 mm, more preferably a length of at least 2 mm, more preferably at least 3 mm, more preferably at least 5 mm, more preferably at least 8 mm and more preferably at least 10 mm. More preferably the bodies have a length in the range of 3 to 15 mm and very preferably a length in the range of 5 to 15 mm.

According to the invention, it has been found that the effect of the bodies as elasticizers can depend in particular on the ratio of their length to the grain diameter of the grains of the raw materials of the base component. In accordance with the invention, it has been found that the bodies develop their effect as micro-crack formers and thus as elasticizers particularly advantageously when the base component is made of at least one refractory ceramic raw material in the form of grains and the bodies have a length which corresponds at least to the length of the average grain diameter of the largest grains of the base component. In other words, the bodies have a length at least equal to the length of the mean grain diameter of the largest grains of the base component.

The mean grain diameter of the largest grains of the base component can be determined in particular according to DIN EN ISO 13383-1:2016-11.

According to the invention, it has been found that the bodies develop their effect as elasticizers in a refractory product in a particularly advantageous manner if they are present in a specific volume fraction in the batch or the product produced from it. In this respect, it may be provided that the bodies are present in the batch in a proportion in the range from 0.5 to 30% by volume, relative to the total volume of the batch. In this respect it may be provided that the bodies are present in a volume fraction of at least 0.5% by volume, relative to the total volume of the batch, more preferably in a volume fraction of at least 1% by volume, even more preferably of at least 1.5% by volume and even more preferably in a volume fraction of at least 2% by volume in the batch. Furthermore, it may be provided that the bodies are present in the batch in a volume fraction of at most 30% by volume, relative to the total volume of the batch, more preferably in a volume fraction of at most 25% by volume, even more preferably of at most 20% by volume and even more preferably in a volume fraction of at most 15% by volume. In this respect, the bodies may preferably be present in a proportion in the range from 1 to 20% by volume in the batch, more preferably in a volume proportion in the range from 1 to 15% by volume and even more preferably in a volume proportion in the range from 2 to 15% by volume, in each case relative to the total volume of the batch. In accordance with the invention, it has been found that the bodies cannot or can only develop their effect as elasticizers to an insufficient extent if they are present in the batch or the product produced from it below the aforementioned mass fractions. Furthermore, it has been found that the micro-crack formation by the bodies in the product can become too extensive if the bodies are present in the batch above the aforementioned proportions. However, the strength of the product can be worsened by too extensive micro-crack formation.

Insofar as the figures given here in % by volume are relative to the total volume of the batch, the total volume of the batch is the bulk volume of the batch.

The base component can be present in a volume fraction in the range of 70 to 99.5% by volume, relative to the total volume of the batch. In this respect, the base component may, for example, be present in a volume of at most 99.5% by volume, relative to the total mass of the batch, more preferably in a mass fraction of at most 99% by volume, even more preferably in a volume fraction of at most 98.5% by volume and even more preferably in a volume fraction of at most 98% by volume in the batch. Preferably, the base component can be present in a volume fraction in the range of 80 to 99% by volume, more preferably in a volume fraction in the range of 85 to 99% by volume and even more preferably in a volume fraction in the range of 85 to 98% by volume, in each case relative to the total volume of the batch.

Unless otherwise stated in individual cases, the information given herein on volume fractions or mass fractions of a component which are related to the total volume or the total mass of the batch, are relative to the total volume or the total mass of the batch without any volume or mass fractions of free carbon which the batch may also have. Free carbon may be known to exist in particular in the form of graphite, soot or similar carbon carriers.

It may be provided that the bodies and the base component add up to 100% by mass, i.e. the total mass of the batch. Accordingly, according to this embodiment, the batch has no other components apart from the base component and the bodies—apart from any shares of free carbon.

According to one embodiment, it is intended that the batch has, in addition to the base component and the bodies, further components in a volume fraction below 10% by volume, related to the total volume of the batch, more preferably below 9% by volume, even more preferably below 5% by volume and even more preferably below 1% by volume.

Where the batch is used to produce a sintered refractory ceramic product, it may in particular be provided that the batch has free carbon contents of less than 10% by mass, relative to the total mass of the batch excluding the free carbon, more preferably less than 5% by mass and even more preferably less than 1% by mass.

Insofar as the batch is used for the manufacture of a sintered refractory ceramic product, it may accordingly be provided that the bodies and the base component add up to at least 90% by mass, more preferably 95% by mass and even more preferably at least 99% by mass, in each case relative to the total mass of the batch.

Insofar as the batch is used for the production of a carbon-bonded refractory product or for the production of a refractory product with a mixed bond (i.e. with a ceramic bond and a carbon bond), it may in particular be provided that the batch has proportions of free carbon of up to a maximum of 30% by mass, relative to the total mass of the batch without the free carbon, preferably a proportion in the range of 1 to 30% by mass, more preferably in a proportion in the range of 3 to 30% by mass.

Insofar as the batch is used to produce a carbon-bonded refractory product or to produce a refractory product with a mixed bond, it may be provided that the bodies, the base component and free carbon add up to at least 90% by mass, more preferably to 95% by mass and even more preferably to at least 99% by mass, in each case in relation to the total mass of the batch.

According to the invention, the base component can comprise at least one of the following refractory ceramic raw materials: magnesia, doloma, spinel (in particular magnesia spinel), corundum, forsterite, chromite, chromium corundum, magnesia chromite or mullite, preferably to at least 90% by mass, more preferably at least 95% by mass, even more preferably at least 99% by mass or even 100% by mass, in each case relative to the total mass of the base component.

Preferably, it may be provided in particular that the base component comprises such raw materials on the basis of which a refractory ceramic product manufactured from the batch according to the invention is highly refractory. In this respect, it may in particular be provided that the base component does not include the raw materials forsterite and/or mullite or only includes them to a small extent. In this respect, the base component may preferably also include at least one of the following refractory ceramic raw materials: magnesia, doloma, spinel (especially magnesia spinel), corundum, chromite, chromium corundum or magnesia chromite, more preferably magnesia, doloma, magnesia spinel or corundum, more preferably magnesia and even more preferably sintered magnesia, preferably each to at least 90% by mass, even more preferably at least 95% by mass, even more preferably at least 98% by mass and even more preferably at least 99% by mass or even 100% by mass, in each case relative to the total mass of the base component.

If the base component is present in the form of magnesia, it may be present in the form of at least one of the raw materials sintered magnesia or fused magnesia. If the base component is present in the form of doloma, it may be present, for example, in the form of at least one of the raw materials sintered doloma or fused doloma. If the base component is present in the form of corundum, it may be present in the form of at least one of the raw materials fused corundum, sintered corundum or calcined alumina.

It may be provided that the base component consists exclusively of basic raw materials, i.e. raw materials based on MgO, i.e. in particular at least one of the following refractory ceramic raw materials: magnesia, doloma, spinel (especially magnesia spinel) or forsterite.

It may be provided that the base component consists of MgO to at least 50% by mass, relative to the total mass of the base component, more preferably to at least 60% by mass, even more preferably to at least 70% by mass, even more preferably to at least 80% by mass and even more preferably to at least 90% by mass.

The base component or the raw materials of the base component are preferably present in granular form, i.e. in the form of grains. These grains are especially single grains, i.e. not sintered together.

It is preferred that the grains of the base component have a maximum grain diameter, i.e. grains with an average grain diameter of maximum 10 mm. The average grain diameter of the largest grains of the raw materials of which the base component consists is, according to one embodiment, a maximum of 10 mm, more preferably a maximum of 8 mm, even more preferably a maximum of 6 mm and even more preferably a maximum of 5 mm. The average grain diameter of the largest grains is determined according to DIN EN 623-3:2003.

Like any refractory product, the bodies of the batch according to the invention have a certain microstructure.

Furthermore, the base component of the batch according to the invention—by firing the batch according to the invention—also forms a certain microstructure.

According to the invention, the term "microstructure" in the sense of the usual definition of this term in the field of ceramics means both the type and quantity of the phases as well as their size, shape, orientation and distribution in the ceramic product.

According to the invention, it is preferably provided that the base component as well as the bodies are present in the batch in such a way that, in a refractory product produced from the batch by firing, the area of the product formed from the base component on the one hand and the areas of the product formed from the bodies on the other hand differ with regard to their respective microstructure. In other words: In a refractory product produced by firing the batch according to the invention, the area of the product formed by the base component has a microstructure which is different to that of the areas which are formed by the bodies.

In accordance with the invention, it was found that not only the geometry of the bodies can have an influence on their effectiveness as elasticizers, but also their microstructure. It was found that the bodies form the more microcracks in a refractory product produced from a batch according to the invention, i.e. the more they act as elasticizers, the more the microstructure of the bodies differs from the microstructure of the area formed from the base component. For this reason, it may be provided that the bodies have a different microstructure than a microstructure formed from the base component after firing of the batch according to the invention in a refractory product produced from it. In order to achieve this am, the skilled person has numerous possibilities from the state of the art at his disposal. In particular, the skilled person is aware that the microstructure of a refractory product is formed depending on the type and nature of the raw materials used to form the microstructure, i.e. in particular the type of raw materials used, their respective mass fraction and their respective grain size.

One subject of the invention is also a method for producing a refractory product comprising the following features:

Provision of a batch in accordance with the invention;
firing the batch to a refractory product.

The batch according to the invention provided for the process according to the invention may be mixed, for example in a mixing device, such as a compulsory mixer. This enables an intimate mixing of the bodies as well as the raw materials of the base component so that the bodies are randomly and evenly distributed over the volume of the batch and thus also over the volume of the refractory product that can be produced from the batch. Before and/or during the mixing of the batch, a conventional binder, in particular a green binder such as lignin sulphonate, may be added to the batch. This green binder can be used in particular to give green strength to a green body formed from the batch.

The, possibly mixed, batch can be formed into a shaped body, a so-called green body, for example by pressing.

The green body can be dried, for example in a drying unit, for example in a drying furnace.

The batch, possibly formed into a green body and possibly dried, can then be fired into a refractory product. In particular, the firing may be carried out in a furnace.

If the batch according to the invention is used to produce a refractory ceramic product, the firing is carried out as a sintering, in which the components of the batch sinter together. Firing of the batch can be carried out at temperatures suitable for sintering the components of the batch. These temperatures are selected depending on the type and condition of the components of the batch. For example, firing can be carried out at temperatures between 1,400 and 1,600° C.

Insofar as the batch in accordance with the invention is used to produce a refractory carbon-bonded product, the firing is carried out in such a way that the carbon of the batch forms a carbon bond which connects the components of the batch with each other. The firing of the batch can be carried out at temperatures suitable for the formation of a carbon bond. These temperatures are selected depending on the type and nature of the components of the batch. For example, firing can be carried out in a reducing atmosphere at temperatures between 1,400 and 1,600° C.

After firing, the batch is allowed to cool down. After cooling, a refractory product is obtained.

One subject of the invention is also a refractory product, which may in particular be produced by a method according to the invention and which comprises the following features:

A first area of interconnected grains of at least one refractory ceramic raw material; and second areas, the second areas having the following features:

The second areas consist of grains of at least one refractory ceramic raw material sintered together, the second areas having a proportion of clay minerals of less than 10% by mass relative to the total mass of the second areas;

the second areas have a ratio of (thickness):(width): (length) of (1):(≥1 and ≤length):(≥3);

the second areas are arranged without order in the first area;

the first area on the one hand and the second areas on the other hand differ in their respective microstructure.

If the refractory product is manufactured from a batch according to the invention by the method according to the invention, the first area is formed by firing from the base component and the second area is formed by firing from the bodies.

Insofar as the product is present as a refractory ceramic product, the grains of the first area are connected to each other via a sintered bond or the first area is made up of grains of at least one refractory ceramic raw material sintered to each other. If the product is present as a refractory carbon-bonded product, the grains of the first area are bonded together by a carbon bond or the first area consists of grains of at least one refractory ceramic raw material bonded together by a carbon bond.

During firing, the first area thus forms a matrix in which the bodies are embedded as second areas of the refractory product. In particular, the second areas are embedded like islands in the matrix formed from the base component, i.e. in the form of small areas isolated from one another.

The second areas in the refractory product unfold their above-mentioned effect as elasticizers, which is indicated by a significantly low modulus of elasticity of the refractory product.

However, according to the invention, it was also found that the refractory properties of such a second area can deteriorate with a refractory ceramic product with a different microstructure, in particular the high refractoriness of such a product can deteriorate. In particular, it has been found that the properties for refractoriness under load of such a product may deteriorate if the composition of the areas is such that they form melting phases even at relatively low application temperatures of the product. In this respect, it was determined according to the invention that the second areas should have a proportion of clay minerals of less than 10% by mass, so that the second areas do not form such quantities of low-melting phases at relatively low temperatures, i.e. in particular already at temperatures below 1400° C. or more preferably below 1450° C., which negatively affect the temperature resistance of the product.

The refractory ceramic product according to the invention preferably has values for refractoriness under load $T_{0.5}$ of >1,400° C., more preferably of >1,450° C. and even more preferably >1,500° C. The value for the refractoriness under load is determined according to DIN EN ISO 1893:2008-09.

In this context, clay minerals are understood to be aluminosilicates in particular, especially clay minerals of the kaolin group, especially kaolinite. In order not to deteriorate the refractory properties of a refractory ceramic product according to the invention with regard to its refractoriness under load, it is provided in this respect that the second areas have a proportion of clay minerals of less than 10% by mass and particularly preferably have a proportion of clay minerals as close as possible to a proportion of 0% by mass, i.e. more preferably less than 9, even more preferably less than 5% by mass, even more preferably less than 3% by mass, even more preferably less than 2% by mass and even more preferably less than 1% by mass, in each case relative to the total mass of the second areas.

According to the invention, it was found that in particular the refractory properties of a refractory ceramic product according to the invention deteriorate with respect to its refractoriness under load when the second areas contain a proportion of the clay mineral mullite. According to the invention, it is therefore preferably provided that the second areas have a proportion of mullite below 7% by mass, more preferably below 3% by mass and even more preferably below 1% by mass, in each case relative to the total mass of the second areas.

Likewise, in order to keep the proportion of any melting phases formed in the second areas as low as possible, it may be provided that the second areas each have a proportion of $SiO_2$ below 30% by mass, relative to the total mass of the second regions, in particular also below 20%, more preferably below 10% by mass, even more preferably below 5% by mass, even more preferably below 3% by mass and even more preferably below 1% by mass.

Also in order to keep the proportion of melting phases in the second areas as low as possible, it may be provided that the second areas have a proportion of glass phases below 10% by mass, relative to the total mass of the second areas, more preferably below 5% by mass, even more preferably below 3% by mass and even more preferably below 1% by mass.

Finally, also in order to keep the proportion of melting phases in the second areas as low as possible, it may be provided that the second regions have a total mass of alkalis, in particular a total mass of $Na_2O$, $K_2O$ and $Li_2O$, of less than 3% by mass, relative to the total mass of the second areas, more preferably less than 2% by mass and even more preferably less than 1% by mass.

The second areas of the product according to the invention consist of grains of at least one refractory ceramic raw material sintered together.

Basically, the second areas can be formed by sintered grains of any refractory ceramic raw material. Preferably the second areas consist of at least one of the following refractory ceramic raw materials: magnesia, spinel, corundum, zirconia, forsterite, chromium ore, zirconium corundum, zirconium mullite, aluminum titanate, magnesium titanate or calcium titanate, preferably by at least 90% by mass, more preferably at least 95% by mass or even 100% by mass, in each case relative to the total mass of the second areas.

Magnesia (MgO) may be present in the second areas in the form of at least one of the raw materials sintered magnesia or fused magnesia. Spinel is at least one mineral from the group of spinels. In particular, spinel may be present in the form of at least one of the minerals magnesia spinel ($MgAl_2O_4$), hercynite ($FeAl_2O_4$), galaxite ($MnAl_2O_4$), chromite ($FeCr_2O_4$), pleonaste ($(Mg, Fe)(Al, Fe)_2O_4$), picrochromite ($MgCr_2O_4$), hausmannite ($Mn_3O_4$), magnetite ($Fe_3O_4$) or gahnite ($ZnAl_2O_4$). Corundum can be present in the form of at least one of the raw materials fused alumina, sintered alumina or calcined alumina. Zirconia ($ZrO_2$) can be present fully or partially stabilized, for example stabilized by at least one of the oxides CaO, MgO or $Y_2O_3$.

In particular, the second areas may consist of grains sintered together from at least one of the following refractory ceramic raw materials: magnesia, spinel or corundum, preferably magnesia spinel, hercynite or corundum, particularly preferably magnesia spinel, hercynite or sintered corundum, preferably by each at least 90% by mass, more preferably at least 95% by mass or even 100% by mass, in each case relative to the total mass of the second areas.

In accordance with the above-mentioned raw materials, the second areas may comprise at least one of the following mineral phases: periclase (MgO), magnesiaspinel, hercynite, galaxite, chromite, pleonaste, picrochromite, hausmannite, magnetite or gahnite, corundum ($Al_2O_3$), zirconia, forsterite, zircon corundum, zircon mullite, aluminum titanate, magnesium titanate or calcium titanate. In particular, the second areas may comprise the aforementioned mineral phases to at least 90% by mass, more preferably at least 95% by mass, even more preferably at least 98% by mass and even more preferably at least 99% by mass or even 100% by mass, in each case relative to the total mass of the second areas.

According to a preferred embodiment, it is provided that the second areas comprise at least one of the mineral phases periclase, magnesia spinel, hercynite or corundum, particularly preferably magnesia spinel, hercynite or corundum, preferably by at least 90% by mass, even more preferably at least 95% by mass and even more preferably at least 99% by mass or even 100% by mass, in each case relative to the total mass of the second areas.

The second areas have a ratio of (thickness):(width):(length) of (1):($\geq 1$ and $\leq$ length):($\geq 3$). In other words, the width of the second areas is greater than or equal to the thickness of the second areas and less than or equal to the length of the second areas; furthermore, the length of the second areas is greater than or equal to three times the thickness of the second areas.

The second areas thus essentially have a rod-shaped or a plate-shaped geometry. Whether the second regions essentially have such a rod-shaped or a plate-shaped geometry depends on the ratio of the width to the thickness and length of the second areas. If the width is equal to or only slightly greater than the thickness of the respective second area, the second area is essentially rod-shaped. If, on the other hand, the width is greater, and in particular only slightly less than or equal to the length of the second area, the second area is essentially plate-shaped.

According to a preferred embodiment, the second areas have a ratio of (thickness):(width):(length) of (1):(1 to 5):(3 to 5), where the width is smaller or equal to the length of the second area, as explained above.

As explained above in relation to the bodies of the batch, it has been found that the second areas are particularly effective in exerting their elasticizing action and their action to inhibit crack propagation in the product from a length of about 1 mm. Furthermore, it has been found that the second areas can break easily from a length of about 30 mm. Against this background, the second areas have a length in the range of 1 to 30 mm after a preferred embodiment. In this respect, the second areas can preferably have a length of at most 30 mm, more preferably at most 25 mm, even more preferably at most 20 mm and even more preferably at most 15 mm. In addition, the second areas may preferably have a length of at least 1 mm, more preferably a length of at least 2 mm, more preferably at least 3 mm, more preferably at least 5 mm, more preferably at least 8 mm and more preferably at least 10 mm. Particularly preferred, the second areas have a length in the range of 3 to 15 mm and even more preferred a length in the range of 5 to 15 mm.

According to the invention, it has been found that the effect of the second areas as elasticizers may depend in particular on the ratio of their length to the grain diameter of the grains of the raw materials of the first area. In accordance with the invention, it has turned out that the second areas develop their effect as micro-crack formers and thus as elasticizers particularly advantageously when the first area is made of at least one refractory ceramic raw material in the form of grains sintered together and the second areas have a length which corresponds at least to the length of the average grain diameter of the largest grains of the first area. In other words, the second areas each have a length at least equal to the length of the average grain diameter of the largest grains of the first area.

The mean grain diameter of the largest grains of the first area may be determined in particular in accordance with DIN EN 623-3:2003.

In accordance with the invention, it has been found that the second areas develop their effect as elasticizers in a refractory product in a particularly advantageous manner if they are present in a specific volume fraction in the product. In this respect it can be provided that the second areas are present in a volume in the range of 0.5 to 30% by volume, relative to the total volume of the product. In this respect, it may be provided that the second areas are present in the product in a volume proportion of at least 0.5% by volume, relative to the total volume of the product, more preferably in a volume proportion of at least 1% by volume, even more preferably of at least 1.5% by volume and even more preferably of at least 2% by volume. It may also be provided that the second areas are present in the product in a proportion of not more than 30% by volume of the total volume of the product, more preferably in a proportion of not more than 25% by volume, even more preferably in a proportion of not more than 20% by volume and even more preferably in a proportion of not more than 15% by volume of the product. In this respect, the second areas may preferably be present in the product in a proportion ranging from 1 to 20% by volume, more preferably in a proportion ranging from 1 to 15% by volume and even more preferably in a proportion ranging from 2 to 15% by volume of the total volume of the product. According to the invention, it has been found that the second areas cannot or can only insufficiently develop its effect as an elasticizer if it is present in the refractory product below the aforementioned volume fractions. Furthermore, it has been found that micro-crack formation by the second areas in the product can become too extensive if the second areas are present in the product above the aforementioned proportions. However, the strength of the product can be worsened by too extensive micro-crack formation.

The first area can be present in a volume fraction in the range of 70 to 99.5% by volume, relative to the total volume of the refractory product, in the refractory ceramic product. In this respect, the first area may, for example, be present in a mass fraction of not more than 99.5% by volume relative to the total volume of the refractory ceramic product, more preferably in a volume fraction of not more than 99% by volume, even more preferably in a volume fraction of not more than 98.5% by volume and even more preferably in a volume fraction of not more than 98% by volume in the refractory ceramic product. Preferably, the first area may be present in the refractory ceramic product in a volume fraction in the range of 80-99% by volume, more preferably in a volume fraction in the range of 85-99% by volume and even more preferably in a volume fraction in the range of 85-98% by volume, each relative to the total volume of the refractory ceramic product.

Unless otherwise indicated in individual cases, the data given herein with regard to volume fractions or mass fractions of an area or phase, which are relative to the total volume or the total mass of the product, in relation to the total volume or the total mass of the product without any volume or mass fractions of free carbon which, in particular, a product according to the invention in the form of a carbon-bound product may also have. Free carbon in the above sense includes coked carbon and carbon bound by a carbon bond.

It may be provided that the first area and the second areas add up to 100% by mass, i.e. the total mass of the refractory ceramic product. According to this embodiment, the refractory ceramic product thus has no other areas or phases apart from the first area and the second areas—apart from possible proportions of free carbon.

According to one embodiment, it is provided that the refractory ceramic product has, in addition to the first and second areas, further areas or phases in a volume proportion of less than 10% by volume in relation to the total volume of the refractory ceramic product, more preferably less than 9% by volume, even more preferably less than 5% by volume and even more preferably less than 1% by volume.

Where the refractory product is in the form of a sintered refractory ceramic product, it may in particular be provided that the refractory ceramic product has a free carbon content of less than 10% by mass relative to the total mass of the refractory ceramic product excluding the free carbon, more preferably 5% by mass and even more preferably less than 1% by mass.

If the refractory product is in the form of a carbon-bonded refractory product or in the form of a refractory product with a mixed bond (i.e. with a ceramic bond and a carbon bond), it may in particular be provided that the batch contains a maximum of 30% by mass of free carbon relative to the total mass of the product without the free carbon, preferably in the range of 1% to 30% by mass, more preferably in the range of 3% to 30% by mass.

Preferably, the first area comprises sintered grains of at least one of the following refractory ceramic raw materials: magnesia, doloma, spinel (in particular magnesia spinel), corundum, forsterite, chromite, chromium corundum, magnesia chromite or mullite, preferably by at least 90% by mass, more preferably at least 95% by mass, even more preferably at least 99% by mass or even 100% by mass, relative to the total mass of the first area.

Preferably, it may be provided in particular that the first area comprises grains of such raw materials sintered together, on the basis of which a refractory ceramic product according to the invention is highly refractory. In this respect, it may be provided in particular that the first area does not include sintered grains of the raw materials forsterite and/or mullite, or only to a small extent. In this respect, the first area may preferably also include grains of at least one of the following refractory ceramic raw materials which have been sintered together: magnesia, doloma, spinel (in particular magnesia spinel), corundum, chromite, chromium corundum or magnesia chromite, particularly preferably of magnesia, doloma, magnesia spinel or corundum, further particularly preferably of magnesia and very particularly preferably of sintered magnesia, preferably in each case by at least 90% by mass, more preferably at least 95% by mass, even more preferably at least 98% by mass, even more preferably at least 99% by mass or even 100% by mass, in each case relative to the total mass of the first area.

According to the above-mentioned raw materials, the first area may include at least one of the following mineral phases: periclase, spinel (in particular magnesia spinel), corundum, forsterite or picrochromite, preferably at least one of the following mineral phases: periclase, spinel (in particular magnesia spinel) or corundum, and particularly preferably periclase, preferably by at least 90% by mass, more preferably at least 95% by mass, more preferably at least 98% by mass, more preferably at least 99% by mass or even 100% by mass, relative to the total mass of the first area.

It is preferred that the grains of the first area have a maximum grain diameter of 10 mm. The maximum grain diameter of the largest sintered grains of the raw materials from which the first area is formed is, according to one embodiment, a maximum of 10 mm, more preferably a maximum of 8 mm, even more preferably a maximum of 6 mm and even more preferably a maximum of 5 mm. The average grain diameter of the largest grains is determined according to DIN EN 623-3:2003.

According to the invention, it is provided that the first area on the one hand and the second areas on the other hand differ from each other with respect to their respective microstructure. In other words: In the refractory ceramic product, the first area has a different microstructure than the second areas.

According to the invention, it was found that the arrangement of the second areas in the product is of particular importance for the effectiveness of the second areas in the product. Thus, it was found that the second areas can reduce the brittleness of the product particularly effectively if they are arranged without order in the matrix formed by the first area. The second areas are therefore distributed without order, i.e. without rules or uniform orientation over the volume of the product. In this case, they can build up stress fields evenly over the volume of the product and thus create microcracks, which reduce the brittleness of the product and increase its elasticity. According to the invention, it was found in this respect that the second areas must not in any case be largely or completely uniformly oriented in the product, e.g. predominantly oriented in the same direction, since in this case stress fields can build up in the product, which can lead to damage or even destruction of the product.

If the product is produced by means of a batch according to the invention, the irregularity of the second areas in the product can be improved in particular by mixing the components of the batch with each other during the production of the product, in particular by intimately mixing them with each other.

One subject of the invention is further the use of a synthetic raw material of bodies in a batch as described above for the production of a refractory product for reducing the modulus of elasticity of a refractory product which can be produced from the batch.

In particular, the use can be made with the specifications according to the method according to the invention.

Further features of the invention result from the claims as well as from the exemplary embodiment of the invention described below.

All of the features of the invention disclosed herein may be combined with each other, individually or in combination.

EXEMPLARY EMBODIMENT

Four batches according to the invention were produced, each with a base component made of a refractory ceramic raw material in the form of sintered magnesia and a synthetic raw material.

The sintered magnesia of the base component was present in the following grain size distribution, related to the sintered magnesia:

| |
|---|
| 1 to 5 mm: 50% by mass |
| 0.1 to <1 mm: 20% by mass |
| <0.1 mm: 30% by mass |

In addition, the sintered magnesia had the following chemical composition in relation to the sintered magnesia:

| |
|---|
| MgO: 96.4% by mass |
| CaO: 2.0% by mass |
| $SiO_2$: 0.7% by mass |
| $Fe_2O_3$: 0.1% by mass |
| remainder: 0.8% by mass |

The synthetic raw material consisted either of plate-shaped bodies or of rod-shaped bodies, each of which were formed by sintered grains of sintered corundum. The proportion of the mineral phase corundum ($Al_2O_3$) in the plate-shaped bodies and rod-shaped bodies was >99.8% by mass each. The plate-shaped bodies had a length and width in the range of about 3 to 10 mm each and a thickness of about 1 mm. The rod-shaped bodies had a thickness and width of about 1 mm each and a length of about 8 mm.

These components were used to produce the four batches designated V1 to V4 in Table 1 below, the respective compositions of which are given in Table 1.

For comparison purposes, two further batches were produced which were not in accordance with the invention. On the one hand, these batches also included sintered magnesia, which also had the batches of the exemplary embodiments according to the invention. However, the non-inventive batches did not contain one of the synthetic raw materials of the batches according to the invention, but a further raw material in the form of high-grade alumina with a grain size in the range of 0.5 to 1 mm and an $Al_2O_3$ content of 99.8% by mass, relative to the high-grade alumina. The composition of these non-invented batches, which are designated V5 and V6 in Table 1, is also given in Table 1.

TABLE 1

| Component | V1 | V2 | V3 | V4 | V5 | V6 |
|---|---|---|---|---|---|---|
| Sintered magnesia | 96 | 96 | 98 | 98 | 96 | 99 |
| High-grade alumina | | | | | 4 | 1 |
| Plate-shaped bodies | 4 | | 2 | | | |
| Rod-shaped bodies | | 4 | | 2 | | |

The data for the batch examples V1 to V6 in Table 1 are each data in % by volume, relative to the total volume of the respective batch.

The batches V1 to V6 were treated in accordance with the method specified in the invention. For this purpose, the batches V1 to V6 were first mixed in a mixer. During mixing, the batches V1 to V6 were each mixed with a green binder in the form of lignin sulfonate. The binder was added to each of the batches V1 to V6 in a mass fraction of 3.9%, relative to the total mass of the batch without the binder.

The V1 to V6 batches were then formed into green bodies in a press at a pressure of 130 MPa and then dried in a dryer at a temperature of 120° C. for 24 hours.

The dried green bodies were finally fired into refractory ceramic products. The firing was carried out in a furnace at a temperature of 1,600° C. for 6 hours. During this process, the components of the batches V1 to V6 each sintered to a refractory ceramic product.

The sintered, refractory ceramic products obtained by firing the V1 to V4 batches each had a first area of sintered grains of sintered magnesia of the base component. Furthermore, the products obtained from the V1 and V3 batches each had second areas formed from the plate-shaped bodies of the respective V1 and V3 batches. Accordingly, the products made from batches V2 and V4 each had second areas formed from the rod-shaped bodies of the respective batches V2 and V4. The first area formed a matrix of the product from the sintered sintered magnesia, in which the second areas were embedded like islands. The structure of the second areas was formed by an inner area of sintered grains of fused alumina and a peripheral area of magnesia spinel, which surrounded the inner area of the grains of fused alumina. This edge region of magnesia spinel of the second area had been formed during the firing from the fused alumina of the plate-shaped and rod-shaped bodies on the one hand and the sintered magnesia of the base component on the other hand. The geometry of the second areas in the products from the batches V1 and V3 corresponded to the geometry of the plate-shaped bodies and the geometry of the second areas in the products from the batches V2 and V4 corresponded to the geometry of the rod-shaped bodies.

Due to the mixing of the batches V1 to V4, the plate- and rod-shaped bodies were distributed uniformly and randomly over the volume of batches V1 to V4, so that the second areas were arranged uniformly and without order in the matrix formed by the first area in the respective refractory ceramic product.

The first area formed a microstructure of sintered grains of sintered magnesia in the products. The first area consisted mainly of the mineral phase periclase. Thus, the microstructure of the first area and the microstructure of the second area differed clearly from each other, especially with regard to the respective mineral phase periclase and corundum/ magnesia spinel.

Due to their special geometry and their microstructure, which differed from that of the first area, the second areas each acted as elasticizers in the products. This elasticizing effect was demonstrated by means of a significantly reduced modulus of elasticity of the refractory ceramic products.

The sintered, refractory ceramic products obtained by firing the V5 and V6 batches each had a first area made of the sintered grains of sintered magnesia, in which areas of magnesia spinel were embedded. This magnesia spinel had formed during the ceramic firing from the sintered magnesia and the high-grade corundum. This magnesia spinel acted in the products as an elasticizer known from state-of-the-art technology.

In order to determine the brittleness of the refractory ceramic products made from V1 to V6, the modulus of elasticity (E-modulus) of the refractory ceramic products made from V1 to V6 was determined. The modulus of elasticity was determined from the sound travel time according to ASTM C 1419-99a (reapproved 2009).

Table 2 below shows the results of these measurements obtained thereafter, whereby the refractory ceramic products produced from the V1 to V4 batches according to the invention are designated V1 to V4 and the state-of-the-art refractory ceramic products produced from the V5 and V6 batches are designated V5 and V6.

TABLE 2

| Product | Modulus of elasticity [kN/mm$^2$] |
|---|---|
| V1 | 17 |
| V2 | 26 |
| V3 | 33 |
| V4 | 35 |
| V5 | 52 |
| V6 | 65 |

As can be seen from the values given in Table 2, the use of the synthetic raw material consisting of bodies of sintered grains of corundum in the V1 to V4 batches in the refractory ceramic products made from them, according to the invention, made it possible to significantly reduce the modulus of elasticity in products compared with the modulus of elasticity in products made from batches that differed from batches V1 to V4 only in that the batches V1 to V4 had high-grade corundum instead of the bodies.

The invention claimed is:

1. A batch for producing a refractory product comprising the following components:
   1.1 a base component of at least one refractory ceramic raw material, wherein the base component comprises at least 50% MgO by mass; and
   1.2 at least one synthetic raw material with the following features:
      1.2.1 the synthetic raw material consists of bodies, the bodies having the following features:
         1.2.1.1 the bodies consist of grains of at least one refractory ceramic raw material sintered together,
         1.2.1.2. the bodies having a proportion of clay minerals of less than 10% by mass relative to the total mass of the bodies;
      1.2.2. the bodies have a ratio of (thickness):(width):(length) of (1):(≥1 and ≤length):(≥3).

2. Batch according to claim 1, wherein the bodies comprise grains of at least one of the following refractory ceramic raw materials sintered together: magnesia, spinel, corundum, zirconia, forsterite, chromium ore, zirconia corundum, zirconmullite, aluminum titanate, magnesium titanate or calcium titanate.

3. Batch according to claim 1, wherein the bodies have a length in the range of 1 to 30 mm.

4. Batch according to claim 1, wherein the at least one refractory ceramic raw material of the base component is present in the form of grains and wherein the bodies have a length which corresponds at least to the length of the average grain diameter of the largest grains of the base component.

5. Batch according to claim 1, wherein the bodies are present in a volume in the range of 0.5 to 30% by volume in the batch, relative to the total volume of the batch.

6. Batch according to claim 1, wherein the base component is present in a volume in the range of 70 to 99.5% by volume in the batch, relative to the total volume of the batch.

7. Batch according to claim 1, wherein the base component as well as the bodies are present in the batch in such a way that in a refractory product produced from the batch by a ceramic firing, the area of the product formed from the base component on the one hand and the areas of the product formed from the bodies on the other hand differ in their respective microstructure.

8. A method of producing a refractory product comprising the following features:
   8.1 provision of a batch, wherein the batch comprises the following components:
      a base component of at least one refractory ceramic raw material, wherein the base component comprises at least 50% MgO by mass; and
      at least one synthetic raw material with the following features:
         the synthetic raw material consists of bodies, the bodies having the following features:
            the bodies consist of grains of at least one refractory ceramic raw material sintered together,
            the bodies having a proportion of clay minerals of less than 10% by mass relative to the total mass of the bodies;
            the bodies have a ratio of (thickness):(width):(length) of (1):(≥1 and ≤length):(≥3),
   8.2 firing the batch to a refractory product.

9. A refractory product comprising the following features:
   9.1 a first area of interconnected grains of at least one refractory ceramic raw material comprising at least 50% MgO by mass; and
   9.2 second areas, the second areas having the following features:
      9.2.1 the second areas consist of grains of at least one refractory ceramic raw material sintered together, wherein
      9.2.2. the second areas have proportion of clay minerals of less than 10% by mass relative to the total mass of the second areas;
      9.2.3 the second areas have a ratio of (thickness):(width):(length) of (1):(≥1 and ≤length):(≥3);
   9.3 the second regions are arranged without order in the first area;
   9.4 the first area on the one hand and the second areas on the other hand differ in their respective microstructure.

10. Product according to claim 9, wherein the second areas comprise grains of at least one of the following refractory ceramic raw materials sintered together: magnesia, spinel, corundum, zirconia, forsterite, chromium ore, zirconia corundum, zirconmullite, aluminum titanate, magnesium titanate or calcium titanate.

11. Product according to claim 9, wherein the second areas have a length in the range of 1 to 30 mm.

12. Product according to claim 9, wherein the second areas have a length at least equal to the length of the average grain diameter of the largest grains of the first area.

13. Product according to claim 9, wherein the second areas are present in a proportion by volume in the range of 0.5 to 30% by volume, relative to the total volume of the product.

14. Product according to claim 9, wherein the first area is present in the product in a proportion by volume in the range of 70 to 99.5% by volume, relative to the total volume of the product.

15. A method comprising:
utilizing a synthetic raw material in a batch to produce a refractory product to reduce the modulus of elasticity of a refractory ceramic product which can be produced from the batch, the synthetic raw material having the following features:

15.1 the synthetic raw material consists of bodies, the bodies having the following features:
  15.1.1 the bodies consist of grains of at least one refractory ceramic raw material sintered together, wherein the refractory ceramic raw material comprises a base component, the base component comprises at least 50% MgO by mass, and further wherein
  15.1.2 the bodies have a proportion of clay minerals of less than 10% by mass, relative to the total mass of the bodies;
  15.1.3 the bodies have a ratio of (thickness):(width):(length) of $(1):(\geq 1 \text{ and } \leq \text{length}):(\geq 3)$;
15.2 the synthetic raw material is utilized in a batch to produce a refractory product to reduce the modulus of elasticity of a refractory ceramic product which can be produced from the batch.

\* \* \* \* \*